United States Patent [19]

Gleim

[11] Patent Number: 5,036,505
[45] Date of Patent: Jul. 30, 1991

[54] DATA REPRODUCTION ARRANGEMENT FOR RECALLING DATA READABLE WITH AN OPTICAL PICKUP FROM A RECORDED MEDIUM

[75] Inventor: Günter Gleim, Villingen-Schwenningen, Fed. Rep. of Germany

[73] Assignee: Deutsche Thomson-Brandt GmbH, Villingen, Fed. Rep. of Germany

[21] Appl. No.: 328,077

[22] Filed: Feb. 9, 1989

[30] Foreign Application Priority Data

Jun. 11, 1987 [DE] Fed. Rep. of Germany ....... 3719489

[51] Int. Cl.⁵ .......................... G11B 7/00; G11B 7/95
[52] U.S. Cl. ............................... 369/44.25; 369/44.32; 369/54; 369/58; 369/124; 250/201.5
[58] Field of Search ............... 369/44.25, 44.36, 44.32, 369/44.28, 107, 54, 124, 116, 32, 44.29–44.35, 58; 250/205.1, 205.2, 205.4

[56] References Cited

U.S. PATENT DOCUMENTS

| | | | |
|---|---|---|---|
| 4,572,965 | 3/1986 | Yamamura | 369/124 |
| 4,637,003 | 1/1987 | Yokoyawa | 369/32 |
| 4,703,468 | 10/1987 | Baba et al. | 369/44.32 |

FOREIGN PATENT DOCUMENTS 0038936 3/1984 Japan .
0178629 9/1984 Japan .

Primary Examiner—Roy N. Envall, Jr.
Assistant Examiner—Thang V. Tran
Attorney, Agent, or Firm—Max Fogiel

[57] ABSTRACT

A data reproduction arrangement for recalling data that can be read out with an optical pickup from data storage tracks of a recorded medium, in which a beam of light is focused on the recorded medium. The beam is advanced along the data storage tracks by a tracking circuit, and a photodetector receives the beam of light reflected from the recorded medium. A direct-current coupled data signal is generated by the photodetector, and has an upper and lower envelope which are processed to obtain a criterion for controlling the focusing circuit and/or tracking circuit. The lower or upper envelope can be clamped to a predetermined level.

3 Claims, 3 Drawing Sheets

DATA REPRODUCTION ARRANGEMENT FOR RECALLING DATA READABLE WITH AN OPTICAL PICKUP FROM A RECORDED MEDIUM

BACKGROUND OF THE INVENTION

The invention concerns a data-reproduction device for recalling data that can be read out with an optical pick-up from the data-storage tracks of a recorded medium, whereby a beam of light is focused on the recorded medium by means of a focusing circuit and advanced along the data-storage tracks by means of a tracking circuit and whereby the beam of light is reflected from the recorded medium onto a photodetector that generates an electric data signal.

Devices of this type—compact-disk players, optico-magnetic equipment for recording and playback, and recording and playback equipment for DRAW-disk and videodisc players for example—have a optical pick-up consisting of a laser diode, several lenses, a prismatic beam divider, and a photodetector. The design and operation of an optical pickup are described on pages 209 to 215 of Electronic Components and Applications 6, 4 (1984).

The beam of light emitted from the laser diode is focused on the compact disk by lenses and thence reflected onto a photodetector. The data stored on the compact disk are obtained along with the actual value for the focusing circuit and tracking circuit from the signal emitted by the photodetector. The aforesaid reference calls the actual value for the focusing circuit the focusing error and the actual value for the tracking circuit the radial-tracking error.

The controls for the focusing circuit comprise a coil and an objective lens that travels through the coil's magnetic field along the optical axis. The focusing circuit keeps the beam of light emitted by the laser diodes constantly focused on the compact disk by moving the objective lens back and forth. The tracking circuit, which is also often called a radial drive mechanism, moves the optical pick-up radially in relation to the disk, positioning the beam on the spiraling data-storage tracks. In some equipment, the radial drive mechanism comprises what are called a coarse-adjustment mechanism and a fine-adjustment mechanism. The coarse-adjustment mechanism can for example be a spindle that moves the overall optical pick-up, consisting of the laser diode, the lenses, the prismatic beam divider, and the photodetector radially. The fine-adjustment mechanism tilts the beam of light radially, at a prescribed acute angle for example, and the beam can travel a short distance along the radius of the disk due to that motion alone.

To ensure unobjectionable recall of the data, which may represent both picture and sound in a videodisc player or sound alone in a compact-disk player for example, the beam of light must be not only precisely focused on the disk, but also precisely guided along the data-storage tracks.

The photodetector illustrated in the figure on page 213 of the aforesaid reference consists of four square photodiodes A, B, C, and D arrayed in a square. The beam of light focussed on the four photodiodes generates a data signal $HF = AS + BS + CS + DS$ in the photodetector, wherein AS, BS, CS, and DS are the photoelectric voltages generated in photodiodes A, B, C, and D.

Data signal HF can be debased by contamination—dust and fingerprints for instance—and scratches on the disk, which deteriorate the reflectivity of the disk surface, the mirrored surface. Subjecting the compact-disk player to vibration will also interfere with data signal HF, causing the beam of light to leave the data-storage track being scanned and lose focus.

When data signal HF is subjected to interference resulting from vibrations, it is helpful to increase the amplification in the focusing and tracking circuits. Interference deriving from contamination on the surface of the disk on the other hand will be less evident when the amplification in the circuits is lower.

When the beam of light must skip ahead several tracks, to the beginning of a musical selection that the listener wants to hear for example, the number of tracks between the instant position of the beam and the target point, the beginning of the desired selection, is calculated. The tracking circuit then diverts the beam ahead to the beginning of the desired selection. In order to land precisely at the target point, however, the tracks that are to be skipped must be counted exactly.

When data-storage tracks are skipped, the upper envelope of data signal HF becomes sinusoidal. Its absolute amplitude is maximal when the beam shines on a track and minimal when it strikes the area between two tracks. The number of detected maxima will accordingly equal the number of tracks skipped.

As previously mentioned herein, the data signal can be debased by contamination on the surface of the disk and by vibrations, which can lead to errors in counting the maxima while the tracks are being skipped.

SUMMARY OF THE INVENTION

The object of the invention is accordingly to make it possible to determine the cause of debasement of the data signal and to derive therefrom a criterion for controlling the focusing and/or tracking circuit.

The invention attains this object in that the upper and lower envelopes of the signal, which is direct-current coupled, are processed to obtain a criterion for controlling the focusing and/or tracking circuits.

In previously known compact-disk players the data signal is not direct-current coupled as in accordance with the invention but alternating-current coupled by way of a capacitor. The alternating-current coupling, however, makes it difficult to tell from how the data signal behaves whether it is debased or whether the beam of light is skipping several tracks.

BRIEF DESCRIPTION OF THE DRAWINGS

One embodiment of the invention will now be described by way of example with reference to the drawing, wherein.

DESCRIPTION OF THE PREFERRED EMBODIMENTS

Figure 1:
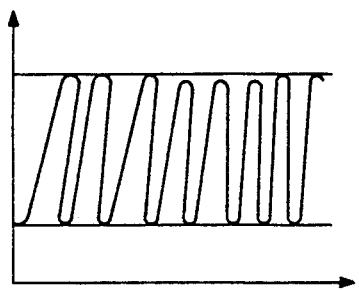
FIG. 1 illustrates a normal data signal HF.

FIG. 1 illustrates a data signal HF subject to ideal conditions. The upper and lower envelopes are both straight lines.

Figure 2:
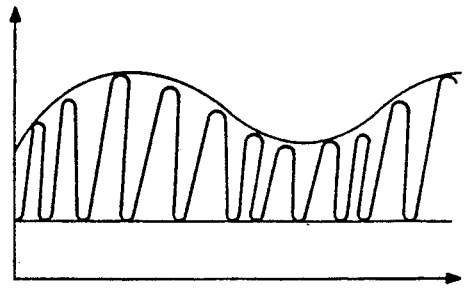
FIG. 2 illustrates a normal data signal HF while tracks are being skipped.

FIG. 2 illustrates the ideal situations while tracks are being skipped. The lower envelope is still a straight line but the upper envelope is sinusoidal.

Figure 3:
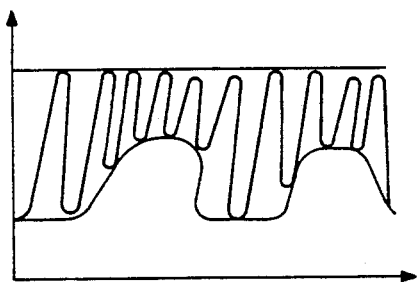
FIG. 3 illustrates a data signal HF debased by contamination on the surface of the disk or by vibrations in the player.

In FIG. 3, although the upper envelope is again a straight line, the lower envelope exhibits irregular bulges due to contamination or scratches on the surface of the disk or to vibration.

Figure 4:
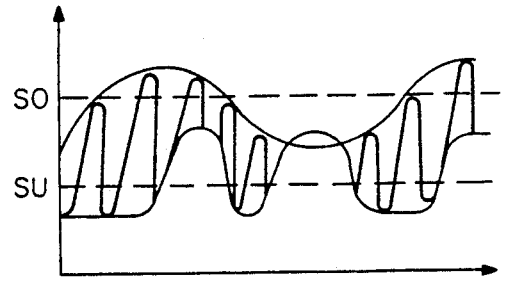
FIG. 4 illustrates a data signal HF debased by contamination on the surface of the disk or by vibrations in the player while tracks are being skipped.

FIG. 4, finally, illustrates the signal as it occurs when the player is subjected to vibration or when there are scratches or contamination, dust or fingerprints for instance, on the surface of the disk while tracks are being skipped. The sinusoidal shape of the upper envelope can be disrupted by the lower envelope, which is similar in shape to that illustrated in FIG. 3.

Figure 5:
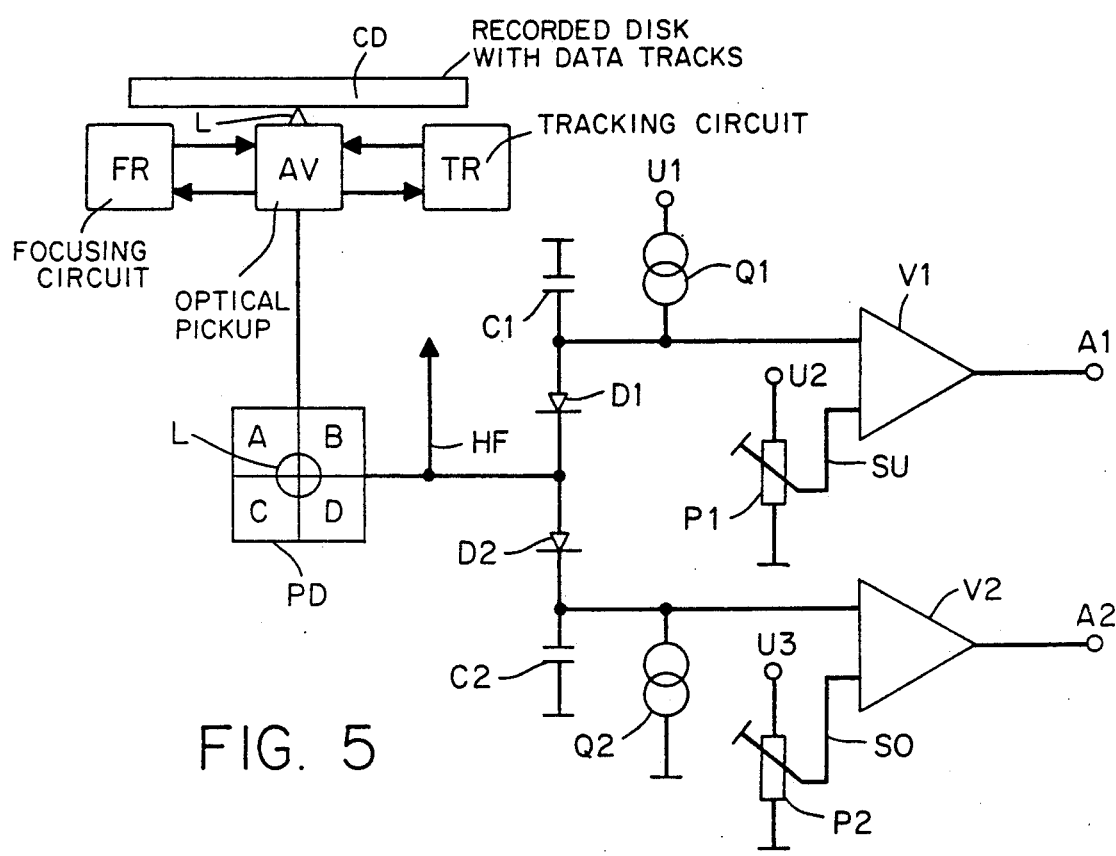
FIG. 5 illustrates one embodiment of the invention.

The invention will now be described with reference to the embodiment illustrated in FIG. 5 and how it operates explained with reference to FIGS. 1 through 4.

The beam L of light reflected from a compact disk is focused on a photodetector PD consisting of four square photodiodes A, B, C, and D. The data signal HF generated by photodetector PD, the sum, that is, of the photoelectric voltages AS, BS, CS, and DS from photodiodes A, B, C, and D, is forwarded for decoding to a circuit of a type generally conventional in compact-disk players that is for simplicity's sake not illustrated. Data signal HF also arrives at the cathode of a diode D1 that is connected to the anode of another diode D2. The anode of diode D1 is connected to one terminal of a capacitor C1, the other terminal of which is at reference potential, to one pole of a source Q1 of current, the other pole of which is at a voltage U1, and to one input terminal of a comparator V1, the other input terminal of which is connected to the tap of a potentiometer P1. There is a voltage U2 at one terminal of potentiometer P1, and its other terminal is at reference potential. The cathode of diode D2 is connected to one terminal of a capacitor C2, the other terminal of which is at reference potential, to one pole of a source Q2 of current, the other pole of which is also at reference potential, and to one input terminal on a comparator V2, the other input terminal of which is connected to the tap of a potentiometer P2. One terminal of potentiometer P2 is at a voltage U3 and its other terminal is at reference potential.

The section of the circuitry illustrated in FIG. 4 that comprises the components D1, C1, Q1, V1, and P1 compares the lower envelope with the lower threshold SU represented by the broken line in FIG. 4. The other section of the circuitry illustrated in FIG. 5, comprising the components D2, C2, Q2, V2, and P2 compares the upper envelope with the upper threshold SO, also represented by a broken line. Comparator V2 emits a signal from its output terminal A2 when the upper envelope of data signal HF drops below upper threshold SO. The signal at output terminal A2 indicates that the beam of light is skipping tracks. Comparator V1 on the other hand emits a signal at its output terminal A1 when the lower envelope of the data signal exceeds lower threshold SU. The signal at output terminal A1 indicates the presence of interference deriving from dirt, fingerprints, scratches, etc. on the compact disk or from vibrations in the compactdisk player. Potentiometers P1 and P2 can be adjusted to establish upper threshold SO and lower threshold SU.

It is of particular advantage to clamp the upper or lower envelope of the data signal. The lower envelope, which corresponds to a reflecting spot, extensively depends on the reflectivity of the compact disk. If the disk is clean and reflects effectively, the distance between the lower envelope and the abscissa in FIGS. 1 through 4 will be minimal. The poorer the reflectivity, however, as the result of dust, fingerprints, etc., the farther the lower envelope will shift up toward the upper envelope. It is for this reason a good idea to clamp the upper envelope, which corresponds to a dark and non-reflecting spot on the disk.

Figure 6:
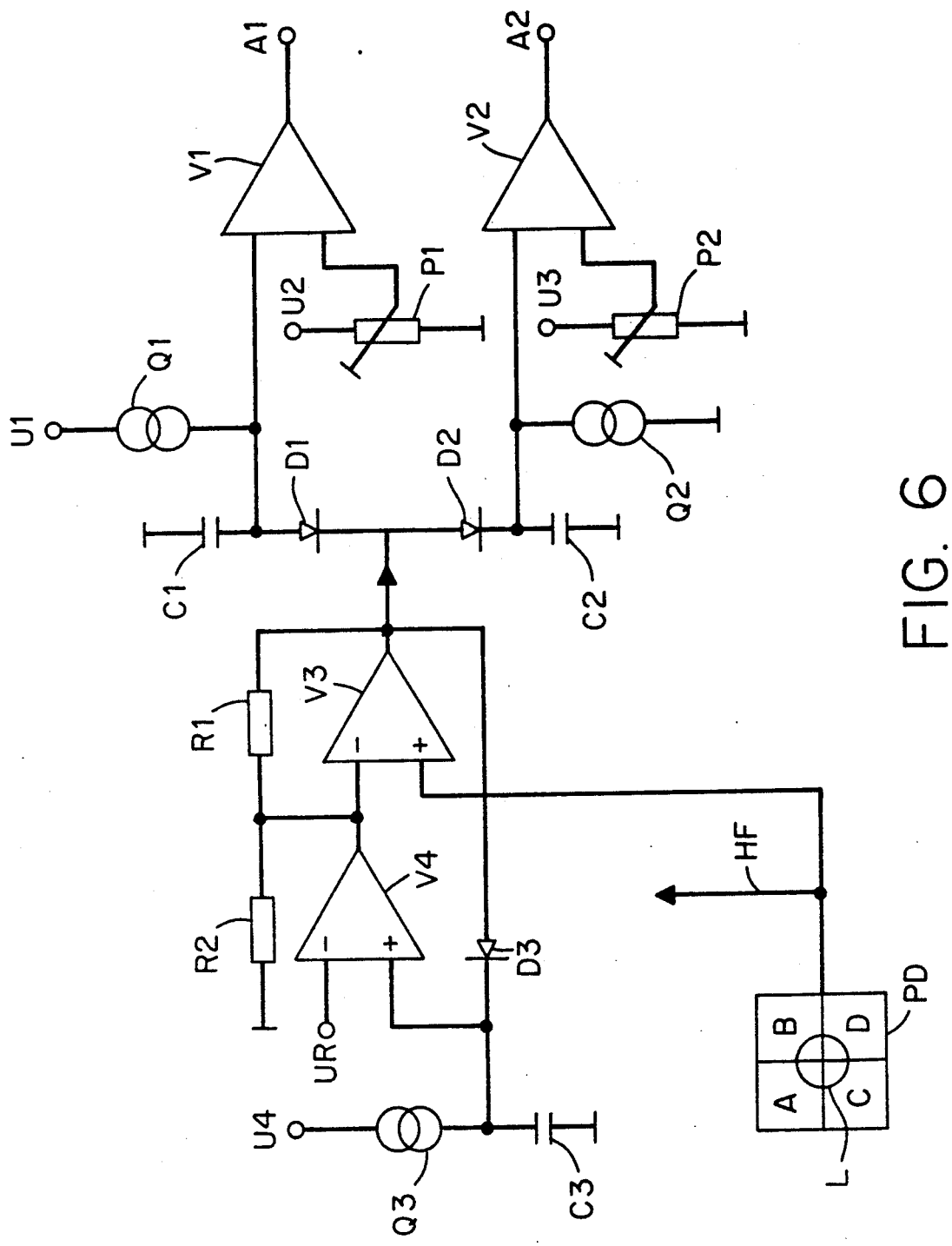
FIG. 6 illustrates another embodiment of the invention.

FIG. 6 illustrates an embodiment of the invention wherein the data signal is clamped to the maximum of the upper envelope, the darkest value, that is, representing no reflection on the disk. It differs from the embodiment illustrated in FIG. 5 by the presence between photodetector PD and diodes D1 and D2 of the clamping circuit that will now be described.

Data signal HF is at the non-inverting input terminal of an amplifier V3, the output terminal of which is connected to the common junction between the cathode of diode D1 and the anode of diode D2. The output terminal of amplifier V3 is also at reference potential by way of a series circuit consisting of two resistors R1 and R2. The common junction of resistors R1 and R2 is connected to the inverting input terminal of amplifier V3 and to the output terminal of another amplifier V4, the inverting input terminal of which is at a reference voltage UR. The non-inverting input terminal of amplifier V4 is connected to one pole of a source Q3 of current, the other pole of which is at a voltage U4, to one terminal of a capacitor C4, the other terminal of which is at reference potential, and to the cathode of a diode D3, the anode of which is connected to the output terminal of amplifier V3. If it is the lower envelope that is to be clamped, it is only necessary to reverse the poles of signal D3.

Since the compact-disk player can immediately tell from data signal HF whether the beam of light is skipping tracks, whether interference deriving from vibration or from contamination on the disk CD is present, or whether both situations are occurring, the focusing FR and tracking TR circuits can be controlled more rapidly and precisely in working with the optical pickup.

I claim:

1. A data reproduction arrangement for recalling data that can be read out with an optical pickup from data storage tracks of a recorded medium, comprising: a recorded medium, with data storage tracks; a focusing circuit for focusing a beam of light on said recorded medium; a tracking circuit for advancing said beam along said data storage tracks; a photodector for receiving said beam of light reflected from said recorded medium and for generating a direct-current coupled electrical data signal having upper and lower envelopes; and means for processing said upper and lower envelopes to obtain a criterion for controlling at least said focusing circuit; means for clamping said data signal to said upper and lower envelopes; first comparator means for comparing the lower envelope with a lower threshold, said first comparator means emitting a signal when said lower threshold is exceeded; second comparator means for comparing the upper envelope with an upper threshold, said second comparator means emitting a signal when said upper threshold is not attained; a first diode with a cathode; a second diode with an anode, said cathode of said first diode being connected to said anode of said second diode, said data signal being connected to a junction between said cathode of said first diode and said anode of said second diode; a first capacitor connected between an anode of said first diode and a reference potential a source of current connected between a first potential and the anode of said first diode; said comparator means having one input connected to the anode of said first diode; a first potentiometer with a tap connected to another input of said first comparator means, said potentiometer having a winding with one end connected to a second potential and having another end of the winding connected to said reference potential; a second capacitor connected between a cathode of said second diode and said reference potential; another source of current connected between the cathode of said second diode and said reference potential; said second comparator means having one input connected to the cathode of said second diode; a second potentiometer having a tap connected to another input of said second comparator means, said second potentiometer having a winding with one end connected to a third potential and having another end connected to said reference potential.

2. A data reproduction arrangement for recalling data that can be read out with an optical pickup from data storage tracks of a recorded medium, comprising: a recorded medium, with data storage tracks; a focusing circuit for focusing a beam of light on said recorded medium; a tracking circuit for advancing said beam along said data storage tracks; a photodector for receiving said beam of light reflected from said recorded medium and for generating a direct-current coupled electrical data signal having upper and lower envelopes; and means for processing said upper and lower envelopes to obtain a criterion for controlling at least said focusing circuit, means for clamping said data signal to said upper and lower envelopes; first comparator means for comparing the lower envelope with a lower threshold, said first comparator means emitting a signal when said lower threshold is exceeded; second comparator means for comparing the upper envelope with an upper threshold, said second comparator means emitting a signal when said upper threshold is not attained; a first diode with a cathode; a second diode with an anode, said cathode of said first diode being connected to said anode of said second diode, said data signal being connected to a junction between said cathode of said first diode and said anode of said second diode; a first capacitor connected between an anode of said first diode and a reference potential a source of current connected between a first potential and the anode of said first diode; said comparator means having one input connected to the anode of said first diode; a first potentiometer with a tap connected to another input of said first comparator means, said potentiometer having a winding with one end connected to a second potential and having another end of the winding connected to said reference potential; a second capacitor connected between a cathode of said second diode and said reference potential; another source of current connected between the cathode of said second diode and said reference potential; said second comparator means having one input connected to the cathode of said second diode; a second potentiometer having a tap connected to another input of said second comparator means, said second potentiometer having a winding with one end connected to a third potential and having another end connected to said reference potential; said clamping means comprising: a first amplifier with output connected to the cathode of said first diode and to the anode of said second diode; a first resistor and a second resistor connected in series and between the output of said amplifier and said reference potential; said first amplifier having an inverting input connected to a junction between said first resistor and said second resistor; a second amplifier with output connected to said inverting input of said first amplifier, said second amplifier having an inverting input connected to a fourth potential; a further source of current connected between a non-inverting input of said second amplifier and a fifth potential; a third capacitor connected between the non-inverting input of said second amplifier and said reference potential; a third diode having a cathode connected to the non-inverting input of said second amplifier, said third diode having an anode connected to the output of said first amplifier.

3. A data reproduction arrangement for recalling data that can be read out with an optical pickup from data storage tracks of a recorded medium, comprising: a recorded medium, with data storage tracks; a focusing circuit for focusing a beam of light on said recorded medium; a tracking circuit for advancing said beam along said data storage tracks; a photodector for receiving said beam of light reflected from said recorded medium and for generating a direct-current coupled electrical data signal having upper and lower envelopes; and means for processing said data signal and said upper and lower envelopes of said data signal only to obtain a criterion for controlling optimum amplification of said tracking circuit and said focusing circuit in reproducing the data on said recorded medium under vibrations and contaminations of said recorded medium; means for clamping said data signal to said upper and lower envelopes; first comparator means for comparing the lower envelope with a lower threshold, said first comparator means emitting a signal when said lower threshold is exceeded; second comparator means for comparing the upper envelope with an upper threshold, said second comparator means emitting a signal when said upper threshold is not attained, so that disturbance in said data signal and controlling signals for said focusing circuit and said tracking circuit are identifiable as to arising from vibrations or contaminations of said recorded medium.

* * * * *